Patented Nov. 24, 1942

2,302,664

UNITED STATES PATENT OFFICE 2,302,664

CHEWING GUM BASE AND COMPOSITION

William H. Carmody, Springfield, Ohio, assignor to Carmody Research Laboratories, Inc., a corporation of Ohio No Drawing. Application July 8, 1939, Serial No. 283,486

2 Claims. (Cl. 99—135)

This invention relates to chewing gum bases and chewing gum compositions containing synthetic selectively saturated and hydrogenated resins which have physical and chemical properties admirably adapting the same therefor.

In my Patent 2,087,900, issued July 27, 1937, I have disclosed as a new chewing gum base a hydrogenated coumarone-indene resin. Such resins are commonly produced by the use of a metallic nickel catalyst and when so produced are characterized by their capacity for ready oxidation and deterioration, by after-yellowing, by incomplete and non-selective saturation with hydrogen and by relatively poor solubility characteristics in hydrocarbon solvents. For a fuller understanding and consideration of these points, reference is made to my copending application Serial No. 280,128, filed June 20, 1939, the pertinent parts of such being hereby made a part hereof.

As I have described and claimed in my aforesaid copending application, I have discovered that with coumarone-indene resins and numerous other resins, when hydrogenated by means of or in the presence of a metallic catalyst such as the conventional spongy nickel catalyst, hydrogenation is non-selective and uncontrollable, particularly as respects hydrogenation of the various zones within the resins in which hydrogenation is capable of occurring. As a result, hydrogenation is not only incomplete in most instances but does not render the resin color-stable, i. e., the hydrogenated resin still has the susceptibility to after-yellowing and chemical deterioration that the original unhydrogenated resin initially possessed. In addition, undesired molecular modification is frequently effected which may alter the essential nature and properties of the resin in question. The same thing is true of numerous other resins referred to in my aforesaid application, with the exception that in certain specific instances color stability is not a particular problem but selectivity and completeness of hydrogenation are in all cases.

Certain of the selectively and/or fully hydrogenated hydrocarbon resins set forth in my aforesaid copending application (hereinafter enumerated) have unexpected and highly improved utility as a chewing gum base as compared with the ordinary hydrogenated coumarone-indene resin set forth in my above designated patent. Due to the fact that the latter resin is susceptible to after-yellowing, chewing gum and the base thereof become objectionable, particularly because the increased color intensity appears to develop or proceed simultaneously with unpleasant gustatory (taste and odor) changes. In other words, since yellowing is, in effect, an oxidation or an undesired chemical modification of the resin, the initially acceptable gustatory characteristics of the base are relatively soon lost and after an appreciable period of time the material is no longer acceptable and must be discarded. The fact that the hydrogenated coumarone-indene resin referred to in my said patent has an appreciable degree of chemical activity renders it unstable under conditions which are often encountered due to local atmospheric conditions, particularly in industrial areas where the atmosphere is contaminated with phosphorus, sulphur and other chemical waste products. While care in the packaging and vending of chewing gum containing such base retards deterioration in some cases for considerable periods of time, such deterioration eventually sets in and renders an appreciable percentage of the material unsaleable. The fact that such hydrogenated coumarone-indene resin is promiscuously saturated in a non-selective and incomplete manner makes the same difficult to compound with oils and other similar or like materials of an oily or waxy nature which are commonly employed as constituents in chewing gum to improve the plasticity and to produce the desired consistency and "chewiness" without excess fluidity or stickiness.

It is therefore an object of my present invention to produce a chewing gum base the predominating masticatable constituent of which consists of a selectively and/or fully hydrogenated resin selected from the group: pinene resins including the plain amber variety, and fully hydrogenated and water-white variety and the clay-bleached water-white variety; dinaphtylmethane resin; petroleum resins, in particular those produced from olefines and diolefines, dihydrocoumarone-indene resin (coumarone-indene resin hydrogenated in zone 1 only as set forth in my copending application referred to); hydrogenated styrene resin (cut back in melting point with hydrogenated indene dimers to a melting point within the range of 60–80° C.); hydrogenated indene dimers; hydrogenated or saturated "Vistanex"; and hydrogenated cyclopentadiene and dicyclopentadiene resins.

Another object of my invention resides in producing a chewing gum base and hence a chewing gum which is characterized by being stable and free from chemical or photo-chemical changes due to oxidation, deterioration, the action of actinic light rays and the presence of chemical contaminants in the atmosphere.

A further object of the invention resides in producing a chewing gum base and hence a chewing gum which is characterized by pleasant initial gustatory characteristics which are retained substantially indefinitely.

A still further object of the invention resides in producing a chewing gum base and hence a chewing gum which has improved qualities and characteristics from the standpoint of mastication, in which connection the base and gum have a pleasing refreshing taste, an attractive stable appearance, and the right qualities of "chewiness" even when chewed for extended periods of time.

Other and further objects and advantages will be understood by those skilled in this art or will be apparent or pointed out hereinafter.

Chewing gum and chewing gum bases, the predominating masticatable ingredient of which is a resin selected from the group: pinene resins including the plain amber variety, the fully hydrogenated and water-white variety and the clay-bleached water-white variety; dinaphthylmethane resin; petroleum resins, in particular those produced from olefines and diolefines; dihydrocoumarone-indene resin (coumarone-indene resin hydrogenated in zone 1 only as set forth in my copending application referred to); hydrogenated styrene resin (cut back in melting point with hydrogenated indene dimers to a melting point within the range of 60–80° C.); hydrogenated indene dimers; hydrogenated or saturated "Vistanex"; and hydrogenated cyclopentadiene and dicyclopentadiene resins, have new qualities of value and utility as well as highly improved properties and characteristics as compared with prior products in general and as compared with the products of my aforesaid Patent No. 2,087,900 in particular. Chewing gum and chewing gum bases composed in accordance with my present invention not only have initially pleasing qualities and characteristics of taste, odor, appearance and chewiness but these properties are permanent or substantially permanent, resulting in no appreciable adverse or deleterious changes even after unusually extensive periods of time. Not only does this provide the intrinsic advantages noted but the same has, as a corollary, advantages in the manufacturing and vending of such products because the same can be produced and packaged in larger quantities than usual without danger of losses due to deterioration. Thus, the invention also has economic advantages.

Inasmuch as the resins referred to are chemically predeterminedly saturated with hydrogen, there is no tendency for these hydrogenated resins to combine with any chemical agents with which they would normally come into contact, and it has been discovered that the same are highly resistant to chemical modification such as might be produced by anticipated exposure to the atmosphere and to the oxygen, sulphur, phosphorus, acid fume or other active chemical constituent which may exist in particular localities.

Chewing gum and chewing gum bases containing any of the hydrogenated resins herein designated do not, therefore, develop any objectionable taste or appearance characteristics, and whereas many unhydrogenated resins and most resins hydrogenated by metal catalysts gradually develop undesired odors, hydrogenated resins in accordance with this invention are entirely free from such. The new resins are also resistant to bacterial action, in which connection the chemically reduced condition thereof does not favor or support bacterial development.

Since selectively and/or fully hydrogenated hydrocarbon resins in accordance with the present invention have solubility characteristics radically different from and much improved over those characteristics of unhydrogenated resins and also of the hydrogenated resins which have been produced by conventional metal catalysts, much greater flexibility is possible in compounding chewing gum bases and chewing gum compositions since the solvent, tempering or plasticizing oils, waxes, etc., commonly employed can be chosen from a much larger group than heretofore, this also producing special advantages in the matter of cost as well as the ability to impart better or different qualities of chewiness without the development of stickiness and other undesired conditions.

Chewing gum bases and chewing gums produced in accordance with the present invention are further characterized by their entire freedom from toxicity, in which connection known resins and hydrogenated resins either initially contain toxic solvents, traces of metallic and acid catalysts and other contaminants or develop the same after aging but such is entirely absent in bases and compositions containing my selectively and/or fully hydrogenated hydrocarbon resins.

The present resins also lend themselves well to the production of special color or appearance effects should such be desired since, due to their color stability, deliberate color introductions can be made such as by means of vegetable dyes and other edible coloring materials without the introduction of subsequent discoloration so long as the coloring materials themselves have the desired non-deteriorating properties.

The selectively and/or fully hydrogenated resins herein disclosed also have unusual compatibility for flavoring ingredients such as mint, anise, peppermint, wintergreen, cinnamon and other frequently employed flavoring agents. The present resins not only tenaciously hold such flavoring ingredients to an extent not comparable with previous products but the novel and valuable properties and characteristics of these resins as above explained prevent undesirable chemical or bacterial change which would render the products objectionable either in storage or in use.

In employing these selectively and/or fully hydrogenated resins in a chewing gum base, the resin is preferably compounded with a suitable wax and oil together with chewing gum grade rubber. Thus, a chewing gum base in accordance with the present invention would comprise, for example, approximately ⅔ selectively and fully hydrogenated resin, approximately ¼ chewing gum grade rubber, approximately ¹⁄₂₀ olive oil, and approximately ¹⁄₂₅ wax, such as candelilla wax.

It is, however, to be understood that any one of the selectively and/or fully hydrogenated resins enumerated above, and others, may be employed in such base, or, if desired, suitable proportions of two or more of such hydrogenated resins may be employed depending upon the particular characteristics which may be desired in any given case. It is to be understood that substitutions may be made for the chewing gum grade rubber, such as the "Vistanex" above referred to. Olive oil may be replaced by mineral oil or some other palatable oil, and beeswax or other suitable form of wax may be substituted for the particular candelilla wax specified. It is further to be understood that balsams and various vegetable oils other than olive oil may equally well be employed and that all such are deemed to be a part of my present invention.

To complete the chewing gum, the usual composition-completing ingredients are added in the usual way, including up to 20-25% sugar and a suitable flavoring ingredient, and the dusting of the gum with powdered sugar or other palatable powder is carried out in conventional manner. The present compositions lend themselves satisfactorily to production in stick, ball, tablet or other form such as is now practiced in producing present chewing gum compositions.

The foregoing is presented as illustrative and not as limitative and within the terms of the appended claims I may resort to various modifications, substitutions, additions and omissions without departing from the spirit or principle hereof. By way of definition, "Vistanex" is rubber-like material resembling white crepe rubber and is odorless and tasteless. Chemically, it is an isobutylene polymer derived by polymerizing isobutylene which has been isolated from the cracked gases produced in a petroleum cracking still and which are treated with boron trifluoride.

Having thus described my invention, what I claim as new and desire to secure by Letters Patent is:

1. A chewing gum base containing selectively hydrogenated pinene resin which is composed of polymerized pinene resin chemically saturated with hydrogen in the presence of an oxide catalyst.

2. A chewing gum base comprising essentially about $2/3$ hydrogenated pinene resin as defined in claim 1, about $1/4$ chewing gum grade rubber, about $1/20$ vegetable oil and about $1/25$ wax.

WILLIAM H. CARMODY.